(12) United States Patent
Yen et al.

(10) Patent No.: US 10,473,531 B2
(45) Date of Patent: Nov. 12, 2019

(54) TEMPERATURE SENSOR AND METHOD OF DETECTING TEMPERATURE

(71) Applicant: NOVATEK Microelectronics Corp., Hsin-Chu (TW)

(72) Inventors: Ying-Chieh Yen, Hsinchu (TW); Min-Hung Hu, Hsinchu (TW); Yuan-Te Chen, Hsinchu (TW); Cun-Kai Zhao, Hsinchu (TW); Chien-Chuan Huang, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 262 days.

(21) Appl. No.: 15/695,021

(22) Filed: Sep. 5, 2017

(65) Prior Publication Data

US 2019/0072435 A1    Mar. 7, 2019

(51) Int. Cl.
*G01K 11/00* (2006.01)
*G01K 7/16* (2006.01)
*G02F 1/1333* (2006.01)
*H02H 5/04* (2006.01)

(52) U.S. Cl.
CPC .......... *G01K 7/16* (2013.01); *G02F 1/133382* (2013.01); *H02H 5/042* (2013.01)

(58) Field of Classification Search
USPC ........................................ 374/100, 163, 170
See application file for complete search history.

(56) References Cited

U.S. PATENT DOCUMENTS

| | | | |
|---|---|---|---|
| 6,334,093 B1 * | 12/2001 | More | G01K 3/14 374/E3.009 |
| 2009/0141770 A1 * | 6/2009 | Chen | G01K 7/00 374/170 |

* cited by examiner

*Primary Examiner* — Mirellys Jagan
(74) *Attorney, Agent, or Firm* — Winston Hsu

(57) ABSTRACT

A temperature sensor includes a plurality of temperature coefficient voltage generators, one or more converters and at least one variable voltage or current source. The temperature coefficient voltage generators are used for generating multiple temperature coefficient voltages. The converters, coupled to the temperature coefficient voltage generators, are used for converting the temperature coefficient voltages to digital values. The at least one variable voltage or current source, each coupled to at least one of the temperature coefficient voltage generators, includes a first variable voltage or current source for outputting a first voltage or current in a first time period, and outputting a second voltage or current in a second time period, wherein the second voltage or current is different from the first voltage or current such that there exists a shift between a first voltage-temperature curve in the first time period and a second voltage-temperature curve in the second time period.

25 Claims, 13 Drawing Sheets

TEMPERATURE SENSOR AND METHOD OF DETECTING TEMPERATURE

BACKGROUND OF THE INVENTION

1. Field of the Invention

The present invention relates to a temperature sensor and a method of detecting temperature, and more particularly, to a temperature sensor and a related method capable of detecting a wide range of temperature.

2. Description of the Prior Art

A circuit system such as an integrated circuit (IC) is usually equipped with temperature sensor(s) to detect the temperature of the circuit system, in order to take proper measures based on the detected temperature. For example, high temperature or overheat protection is a general function of the circuit system operated based on the temperature, where several or all modules of the circuit system may be shut down when the temperature is determined to be higher than a threshold. Therefore, a temperature sensor with high temperature detection capability is necessary in the circuit system.

The operations of a display system are also determined based on the detected temperature since the characteristics of the display panel is influenced by the ambient temperature. For example, the physical characteristics of the liquid crystal may become worse under a low temperature such as below 0° C., where the drifting speed of the liquid crystal molecule becomes slower when the temperature is extremely low. Therefore, a temperature sensor with low temperature detection capability is necessary in the display system.

In general, the temperature sensor is implemented by generating a positive temperature coefficient (PTC) voltage or a negative temperature coefficient (NTC) voltage. Take the PTC voltage as an example. In order to realize the abovementioned high temperature and low temperature detection capabilities, the detectable temperature range of the temperature sensor should be quite large, such as from −30° C. to 80° C. However, the voltage range in the circuit system is limited, such that the slope of the temperature coefficient (i.e., voltage versus temperature) of the temperature sensor cannot be too oblique; that is, the voltage variation cannot be too large in response to temperature variation.

Please refer to FIG. 1A, which is a schematic diagram of the temperature sensing characteristics of a conventional temperature sensor. FIG. 1A illustrates the temperature sensing characteristics with a voltage-temperature curve (V-T curve) $V_{PTC1}$. As shown in FIG. 1A, the detectable temperature range is the linear region of the V-T curve $V_{PTC1}$, e.g., the temperatures T1 and T2 are detectable based on the comparison of the V-T curve $V_{PTC1}$ with the ZTC voltages $V_{ZTC1}$ and $V_{ZTC2}$. The upper limit of the V-T curve $V_{PTC1}$ is VDD-$V_{OV}$, where VDD denotes the supply voltage of the temperature sensor and $V_{OV}$ denotes the overdrive voltage of the high-side transistors in the temperature sensor. When the temperature becomes higher, the V-T curve $V_{PTC1}$ approaches its upper limit VDD-$V_{OV}$ and enters the nonlinear region where the temperature is not detectable.

In order to extend the detectable temperature range of the temperature sensor, the slope of the V-T curve may be decreased, as shown in FIG. 1B. The V-T curve $V_{PTC2}$ has a smaller slope and thus has a larger detectable temperature range. In such a situation, the voltage variation becomes smaller in response to temperature variation, such that the noise immunity and offset resistance of the temperature sensor may become worse, which results in a heavy burden on circuit design. For example, if the slope of the V-T curve $V_{PTC1}$ is 25 mV/5° C. and the tolerable temperature error is 1° C., the voltage error of the temperature sensor should be within 5 mV under the non-ideal factors of the circuitry. If the slope of the V-T curve $V_{PTC2}$ is decreased to 5 mV/5° C. and the tolerable temperature error is still 1° C., the voltage error of the temperature sensor is requested to be within 1 mV, which significantly increases the difficulty and burden on the circuit design. Thus, there is a need for improvement over the prior art.

SUMMARY OF THE INVENTION

It is therefore an objective of the present invention to provide a temperature sensor and a related method of detecting a wide or more desirable range of temperature, capable of solving the abovementioned problem.

The present invention is not limited to the objective described above, and any other objectives not described herein can be comprehended by those in the art from the following disclosure.

An embodiment of the present invention discloses a temperature sensor, which comprises a plurality of temperature coefficient voltage generators, one or more converters and at least one variable voltage or current source. The plurality of temperature coefficient voltage generators are used for generating a plurality of temperature coefficient voltages. The one or more converters, coupled to the temperature coefficient voltage generators, are used for converting the temperature coefficient voltages to one or more digital values. Each of the at least one variable voltage or current source is coupled to at least one of the temperature coefficient voltage generators. The at least one variable voltage or current source comprises a first variable voltage or current source for outputting a first voltage or current in a first time period, and outputting a second voltage or current in a second time period, wherein the second voltage or current is different from the first voltage or current such that there exists a shift between a first voltage-temperature curve in the first time period and a second voltage-temperature curve in the second time period.

An embodiment of the present invention further discloses a method of detecting a temperature. The method comprises providing at least one voltage or current to generate a plurality of temperature coefficient voltages; and converting the temperature coefficient voltages to one or more digital values. The step of providing at least one voltage or current to generate a plurality of temperature coefficient voltages comprises providing a first voltage or current in a first time period, and providing a second voltage or current in a second time period, wherein the second voltage or current is different from the first voltage or current such that there exists a shift between a first voltage-temperature curve in the first time period and a second voltage-temperature curve in the second time period.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
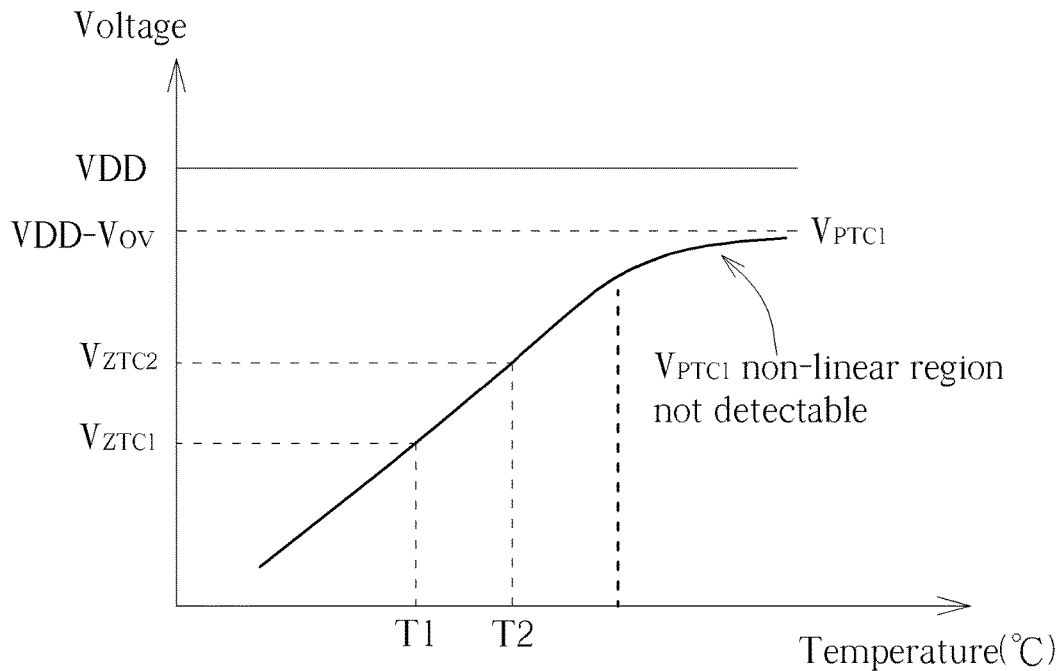
FIG. 1A is a schematic diagram of the temperature sensing characteristics of a conventional temperature sensor.
Figure 1B:
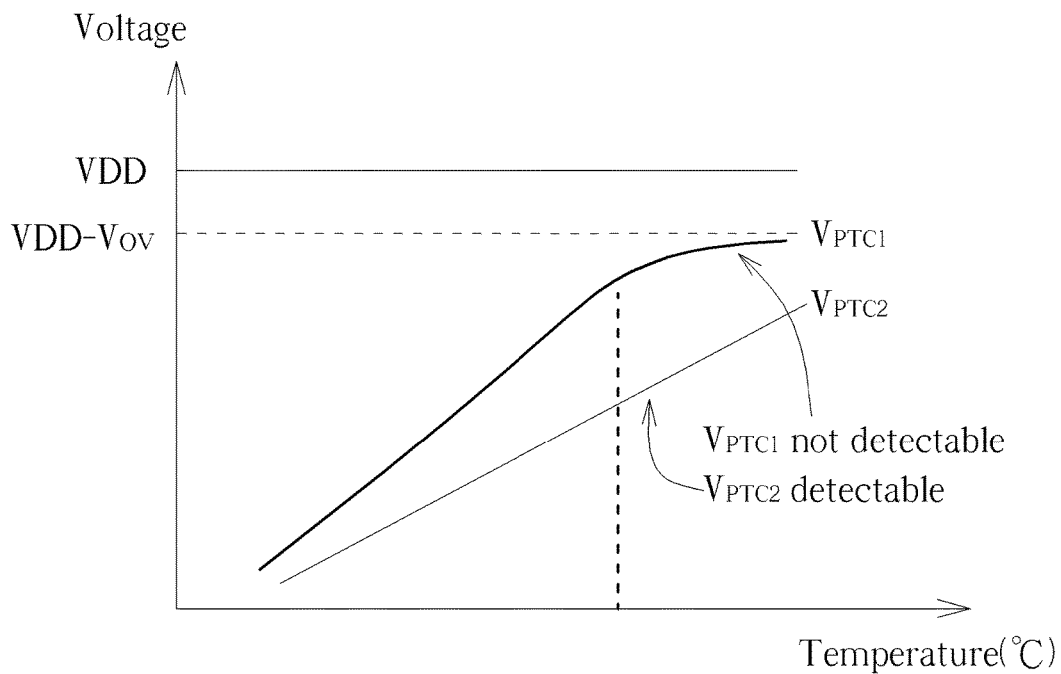
FIG. 1B is a schematic diagram of a V-T curve with a decreased slope.
Figure 2:
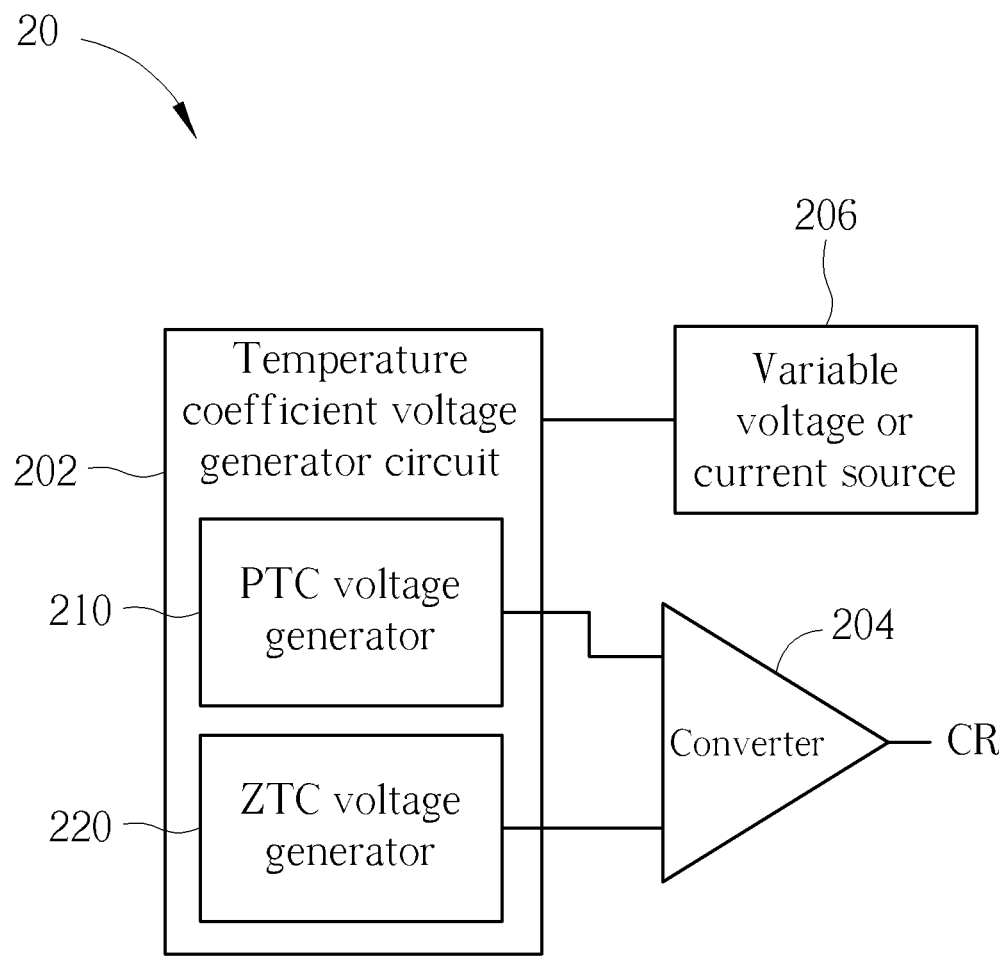
FIG. 2 is a schematic diagram of a temperature sensor according to an embodiment of the present invention.

Please refer to FIG. 2, which is a schematic diagram of a temperature sensor 20 according to an embodiment of the present invention. As shown in FIG. 2, the temperature sensor 20 includes a temperature coefficient voltage generator circuit 202, a converter 204 and a variable voltage or current source 206. The temperature coefficient voltage generator circuit 202 is used for generating one Or more temperature coefficient voltages, such as positive temperature coefficient (PTC) voltages, zero temperature coefficient (ZTC) voltages and/or negative temperature coefficient (NTC) voltages. The converter 204, coupled to the temperature coefficient voltage generator circuit 202, can convert the temperature coefficient voltages to one or more digital values as a conversion result CR. For example, the converter 204 can be realized as a comparator for comparing the temperature coefficient voltages to generate the conversion result CR. In other embodiments, the converter 204 can be realized as a plurality of comparators or an analog to digital converter (ADC) for converting the temperature coefficient voltages to multiple digital values. The variable voltage or current source 206, coupled to the temperature coefficient voltage generator circuit 202, is used for outputting variable voltages or currents to the temperature coefficient voltage generator circuit 202.

In a more detailed exemplary configuration, the temperature coefficient voltage generator circuit 202, for example, includes a PTC voltage generator 210 and a ZTC voltage generator 220. The PTC voltage generator 210 may generate a PTC voltage, and the ZTC voltage generator 220 may generate at least one ZTC voltage; hence, the converter 204 converts the PTC voltage and each of the at least one ZTC voltage to generate the conversion result CR.

Figure 3:
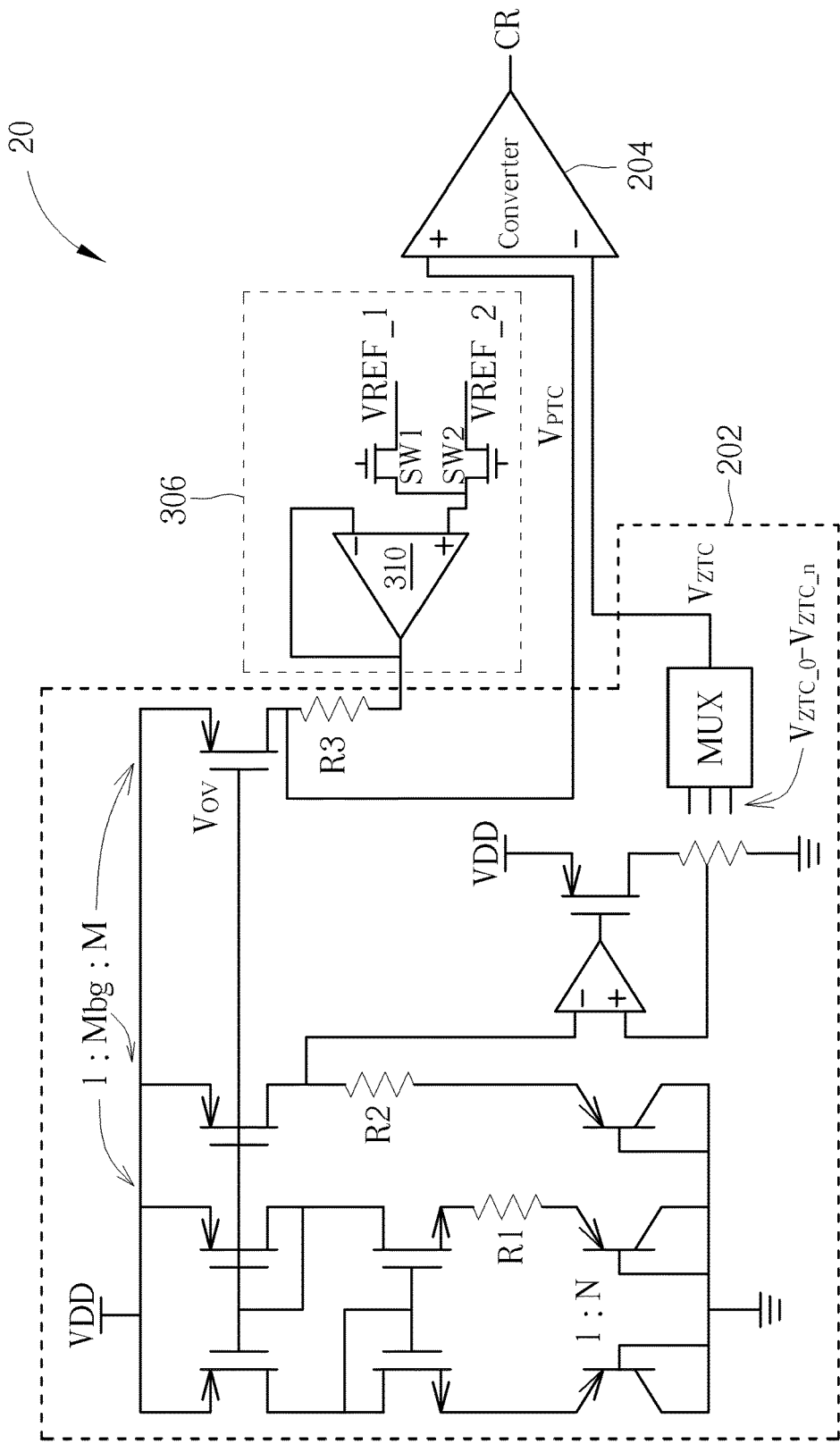
FIG. 3 is a schematic diagram of an implementation of the temperature sensor shown in FIG. 2.

In an embodiment, the variable voltage or current source 206 may be a voltage source coupled to the PTC voltage generator 210. Please refer to FIG. 3, which is a schematic diagram of an implementation of the temperature sensor 20. As shown in FIG. 3, the temperature coefficient voltage generator circuit 202 is realized with a bandgap circuit structure which generates a PTC voltage $V_{PTC}$ and a ZTC voltage $V_{ZTC}$, where the ZTC voltage $V_{ZTC}$ may be selected from ZTC voltages $V_{ZTC\_0}$-$V_{ZTC\_n}$ via the multiplexer (MUX). The converter 204 may convert the PTC voltage $V_{PTC}$ and the ZTC voltage $V_{ZTC}$ to generate the conversion result CR.

In the embodiment, the variable voltage or current source 206 is realized with a voltage source 306. In an exemplary configuration as also shown in FIG. 3, the variable voltage source 306 includes a regulator 310 and a plurality of switches such as two switches SW1 and SW2. The regulator 310 receives a first reference voltage VREF_1 or a second reference voltage VREF_2 and forwards the first reference voltage VREF_1 or the reference voltage VREF_2 to the temperature coefficient voltage generator circuit 202 according to control of the switches SW1 and SW2. In detail, in a first time period, the switch SW1 is turned on and the switch SW2 is turned off, and the regulator 310 outputs the first reference voltage VREF_1 to a terminal of the resistor R3 in the temperature coefficient voltage generator circuit 202; and in a second time period, the switch SW2 is turned on and the switch SW1 is turned off, and the regulator 310 outputs the second reference voltage VREF_2 to the terminal of the resistor R3 in the temperature coefficient voltage generator circuit 202.

In a conventional temperature sensor, a PTC current may flow through a resistor to the ground terminal, to generate the PTC voltage. In comparison, in the embodiment as shown in FIG. 3, the voltage source 306 replaces the ground terminal to be coupled to the resistor R3 of the conventional bandgap circuit structure. The voltage source 306 provides different voltages in different time periods, so that different V-T curves corresponding to the PTC voltage $V_{PTC}$ are generated in different time periods.

Figure 4A:
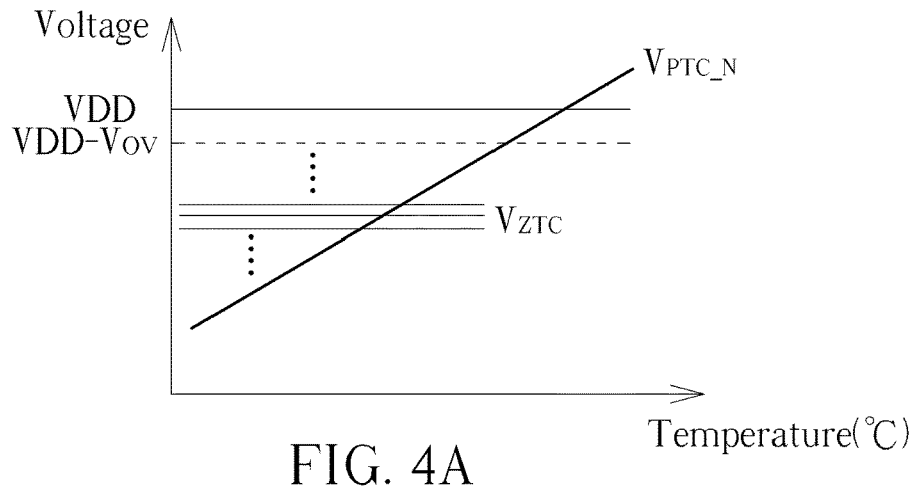
FIGS. 4A-4C illustrate ideal V-T curves of the PTC voltage in the temperature sensor.
Figure 4B:
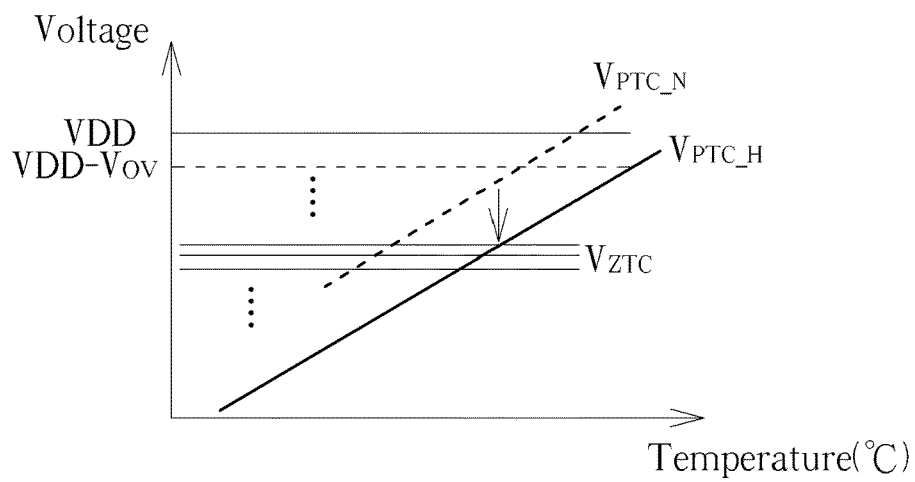

In an embodiment, the first reference voltage VREF_1 may be a zero voltage and the second reference voltage VREF_2 may be a negative voltage. In the first time period, the voltage source 306 provides the zero voltage for the temperature coefficient voltage generator circuit 202, where the temperature sensor 20 may be capable of detecting low temperature or normal temperature. FIG. 4A illustrates an ideal V-T curve $V_{PTC\_N}$ of the PTC voltage $V_{PTC}$ in the temperature sensor 20. The V-T curve $V_{PTC\_N}$ of FIG. 4A shows that low temperature and normal temperature are detectable by the temperature sensor 20, while the voltage range corresponding to high temperature exceeds the upper limit VDD-$V_{OV}$, of the V-T curve $V_{PTC\_N}$ and thus cannot be appropriately or accurately detected. In the second time period, the voltage source 306 provides the negative voltage for the temperature coefficient voltage generator circuit 202, where the temperature sensor 20 may be capable of detecting high temperature. FIG. 4B illustrates an ideal V-T curve $V_{PTC\_H}$ of the PTC voltage $V_{PTC}$ in the temperature sensor 20. As shown in FIGS. 4A and 4B, there exists a shift between the V-T curve $V_{PTC\_N}$ and the V-T curve $V_{PTC\_H}$ due to the difference between the first reference voltage VREF_1 and the second reference voltage VREF_2. In detail, the V-T curve $V_{PTC\_H}$ may be considered as generated by shifting the V-T curve $V_{PTC\_N}$ downward when the output voltage of the voltage source 306 is switched from the first reference voltage VREF_1 to the second reference voltage VREF_2, where the level of the second reference voltage VREF_2 is lower than the level of the first reference voltage VREF_1. The V-T curves $V_{PTC\_N}$ and $V_{PTC\_H}$ shown in FIG. 4A and FIG. 4B show that low temperature and high temperature are both detectable by the temperature sensor 20 without changing the slope of the V-T curves.

Therefore, the circuit system including the temperature sensor 20 can be capable of detecting a wide range of temperature. For example, the temperature sensor of a display system may detect a lower temperature range, e.g., below 0° C., by providing the zero voltage for the temperature coefficient voltage generator circuit 202 in the first time period, allowing the display system to drive the liquid crystal molecules based on the detected temperature. The temperature sensor of the display system may also detect a higher temperature range, e.g., over 70° C., by providing the negative voltage for the temperature coefficient voltage generator circuit 202 in the second time period, to realize overheat protection of the display system. In such a situation, the oblique of the V-T curve does not need to be decreased to be adapted to the wide range of temperature detection. In an embodiment, the voltage source 306 may output the first reference voltage VREF_1 and the second reference voltage VREF_2 alternately, allowing the temperature sensor 20 to detect high temperature and low temperature alternately.

Please note that the implementation of the voltage source 306 shown in FIG. 3 is one of various embodiments of the present invention. Those skilled in the art may make modifications and alternations accordingly. As mentioned above, the voltage source 306 aims at providing different voltages in different time periods, and the voltage source 306 may be realized by other methods. FIGS. 5A-5D illustrate different voltage sources that may be implemented as the variable voltage or current source 206. The detailed operations of the regulator 310 and the switches SW1 and SW2 shown in FIGS. 5A-5D are similar to those shown in FIG. 3, and will not be narrated herein.

Figure 4C:
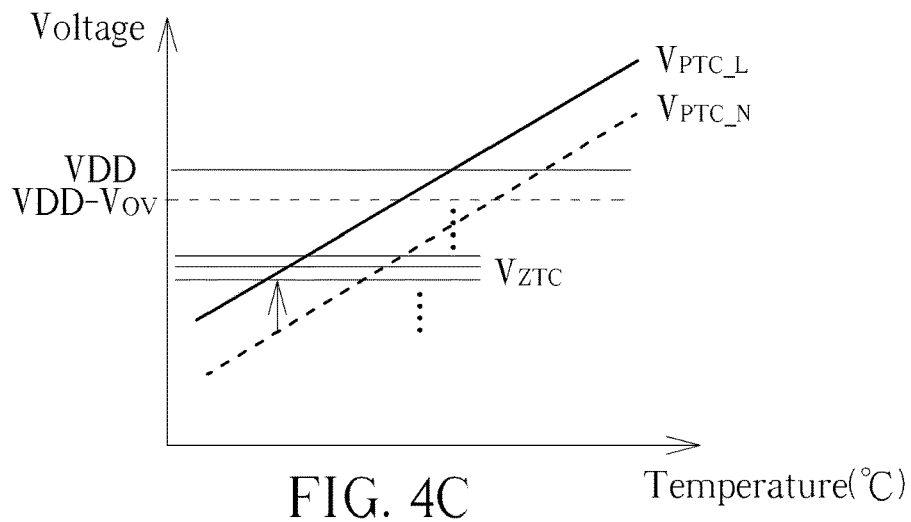
Figure 5A:
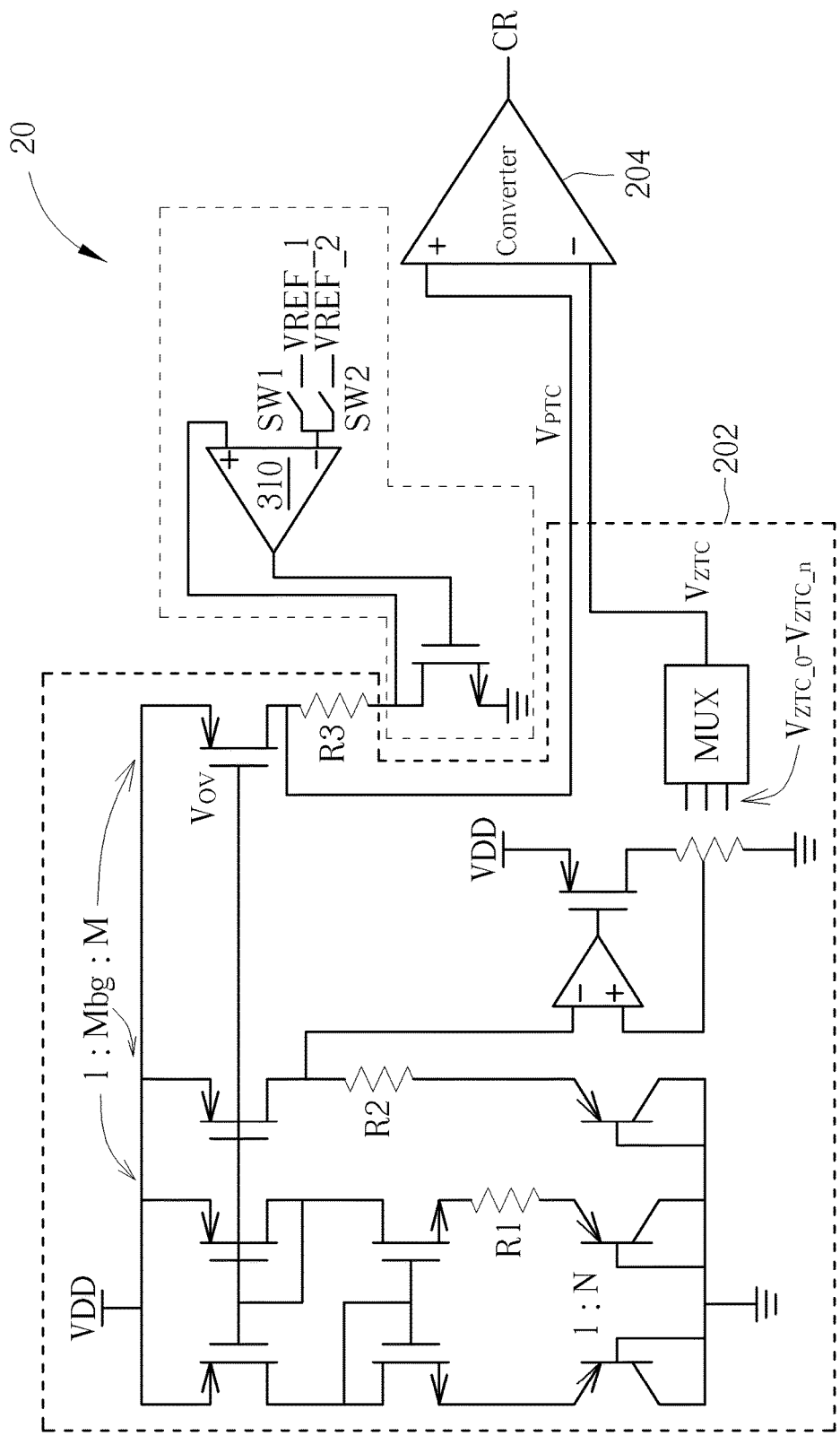
FIGS. 5A-5D illustrate different voltage sources implemented as the variable voltage or current source.
Figure 5B:
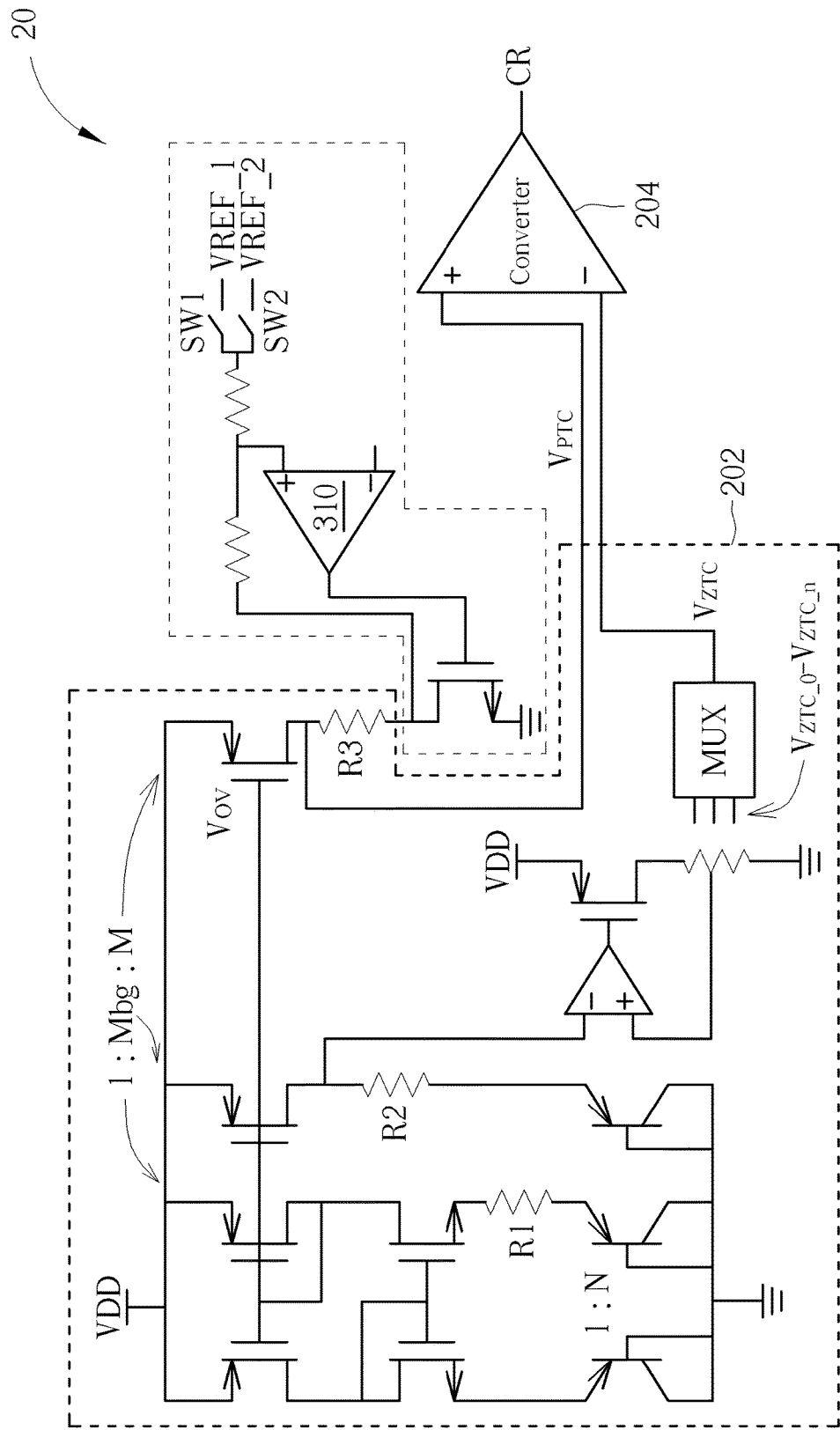
Figure 5C:
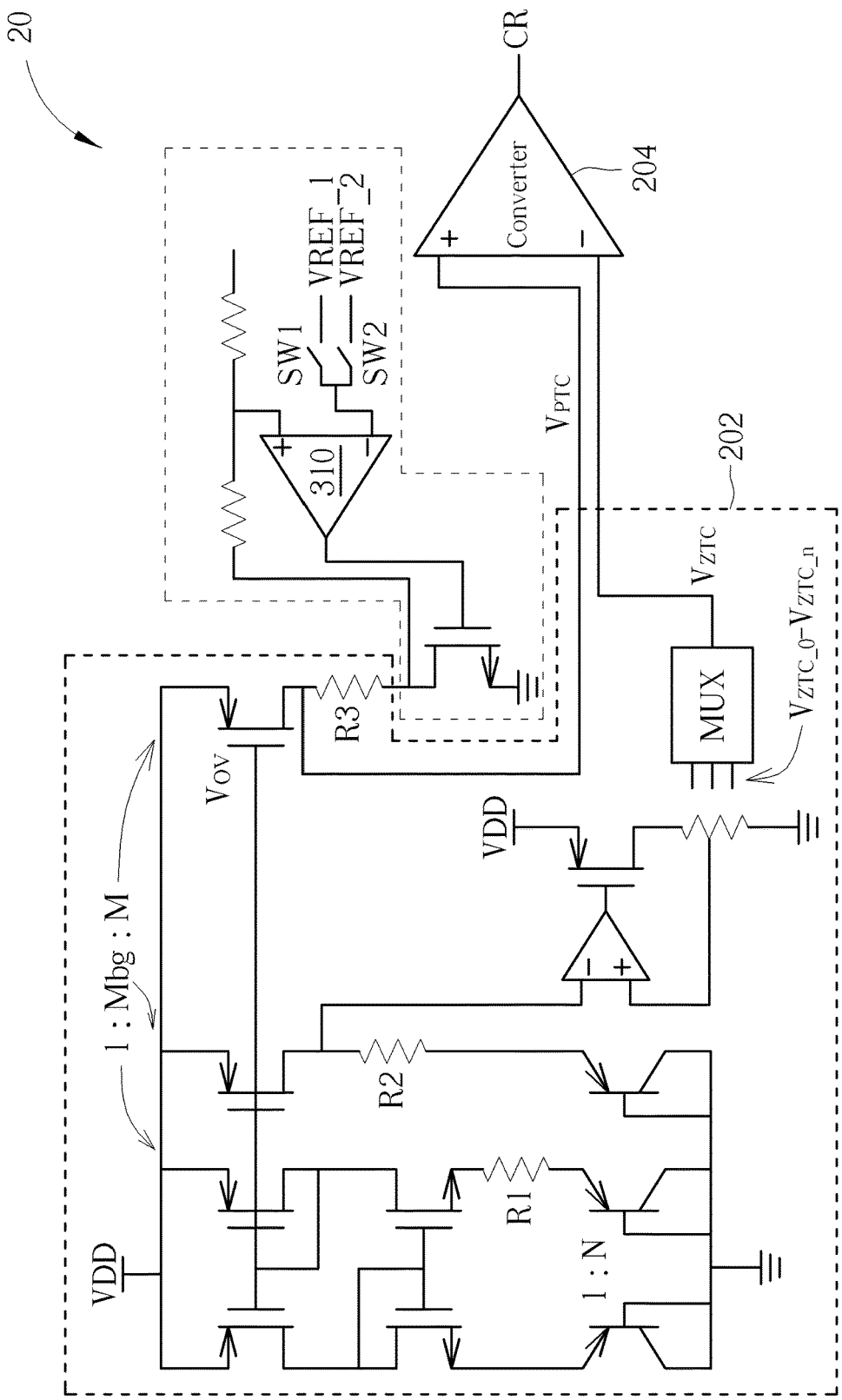
Figure 5D:
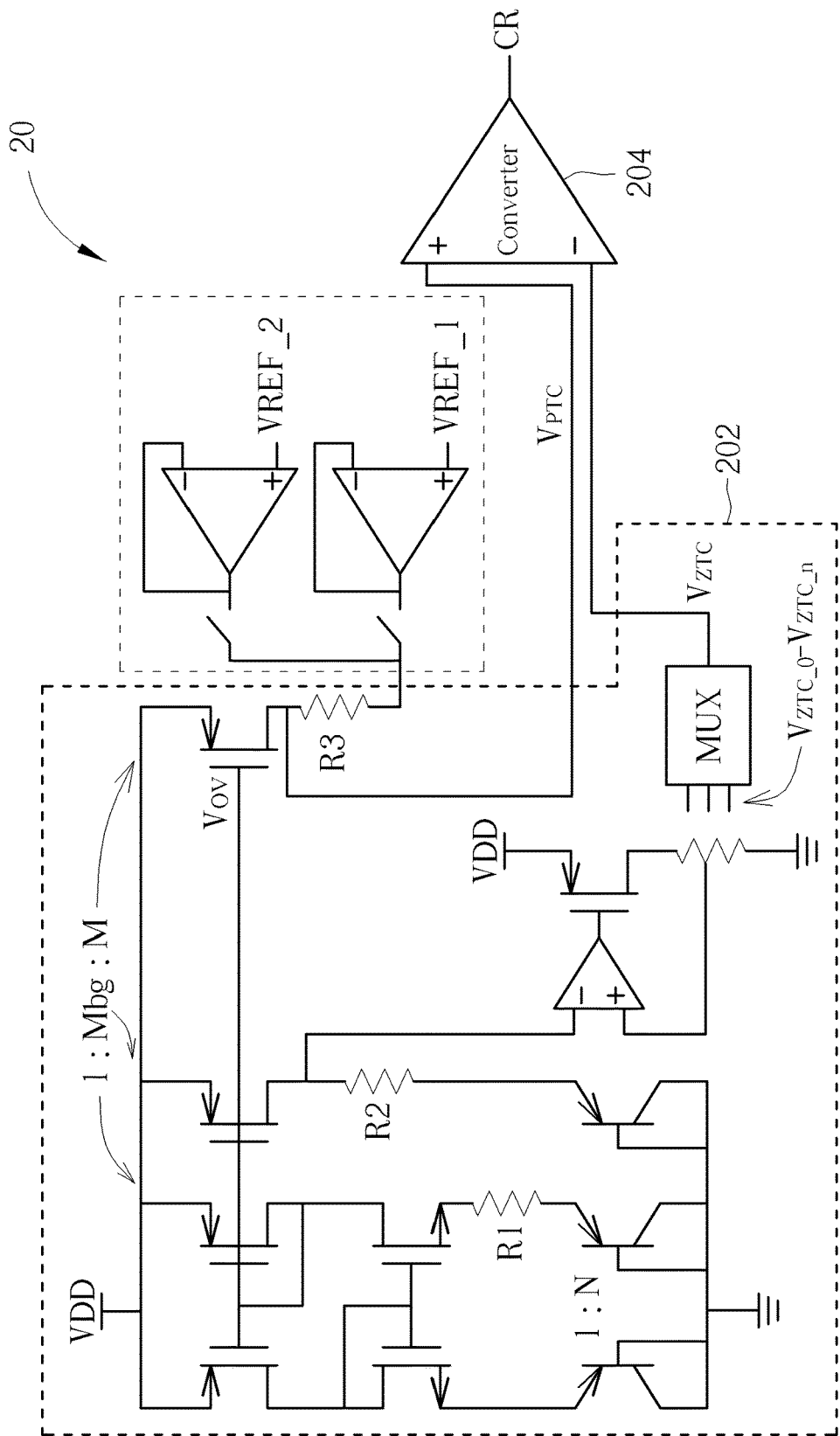

In another embodiment, a voltage source of the temperature sensor may generate more than two different voltages. For example, the voltage source 306 may further generate a third reference voltage. The third reference voltage may be higher than zero voltage and configured for detecting low temperature (e.g., −30° C. to 10° C.), where the first and second reference voltages are configured for detecting normal temperature (e.g., 10° C. to 50° C.) and high temperature (e.g., 50° C. to 90° C.), respectively. Therefore, there exists a shift between the V-T curve corresponding to the third reference voltage and the V-T curve corresponding to the first reference voltage, and also exists a shift between the V-T curve corresponding to the third reference voltage and the V-T curve corresponding to the second reference voltage. FIG. 4C illustrates an ideal V-T curve $V_{PTC\_L}$ of the PTC voltage $V_{PTC}$ when the voltage source 306 outputs the third reference voltage. The V-T curve $V_{PTC\_L}$ may be considered as generated by shifting the V-T curve $V_{PTC\_N}$ upward when the output voltage of the voltage source 306 is switched from the first reference voltage (e.g., the zero voltage) to the third reference voltage (e.g., a positive voltage), where the level of the third reference voltage is higher than the level of the first reference voltage. As shown in FIGS. 4A-4C, a fixed setting of selectable ZTC voltages $V_{ZTC}$ may be applicable to detect high temperature, normal temperature and low temperature in different time periods based on the output voltage of the voltage source.

As a result, the voltage source 306 may output the first reference voltage, the second reference voltage and the third reference voltage by turns, to detect the high temperature, normal temperature and low temperature with time division. By this method, the temperature sensor 20 may keep monitoring the ambient temperature and take measures accordingly. Alternatively, the voltage source 306 may determine whether to output the second reference voltage or the third reference voltage according to the temperature sensing result generated when the first reference voltage is outputted. For example, the voltage source 306 may first output the first reference voltage (e.g., the zero voltage) to detect whether the ambient temperature is beyond the normal temperature range. If the ambient temperature is determined to be higher than the normal temperature range, the voltage source 306 is switched to output the second reference voltage (e.g., a negative voltage) for high temperature detection. If the ambient temperature is determined to be lower than the normal temperature range, the voltage source 306 is switched to output the third reference voltage (e.g., a positive voltage) for low temperature detection. Note that the configuration of more reference voltages outputted by the voltage source 306 allows the entire detectable temperature to be divided into more sections, and the number of selectable ZTC voltages for each section may be reduced accordingly.

Figure 6:
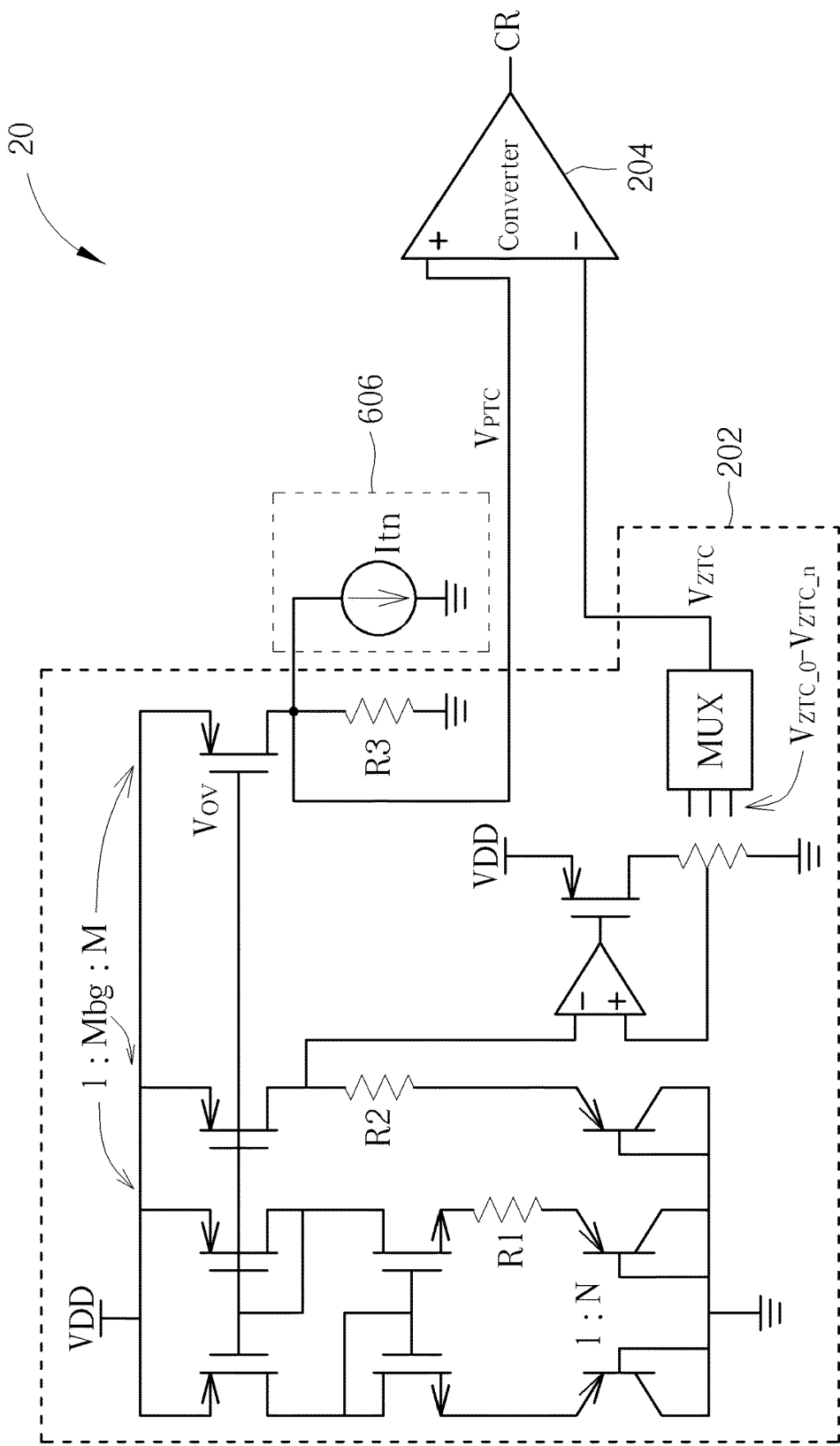
FIG. 6 is a schematic diagram of an implementation of the temperature sensor shown in FIG. 2.

Please note that in the above embodiments, a negative voltage may be incorporated to realize detection of a wide range of temperature. In another embodiment, the negative voltage may not be available in the circuit system. In order to increase the detectable temperature range under a fixed range of supply voltage, a variable current source may be included in the temperature sensor 20 to generate different V-T curves for detection of the wide range of temperature. In other words, the variable voltage or current source 206 may be a current source coupled to the PTC voltage generator 210. Please refer to FIG. 6, which is a schematic diagram of an implementation of the temperature sensor 20, where the variable voltage or current source 206 is realized with a current source 606. The current source 606 is variable and may generate different currents. For example, the current source 606 may output a first current in a first time period to generate a first V-T curve corresponding to the PTC voltage $V_{PTC}$ and output a second current in a second time period to generate a second V-T curve corresponding to the PTC voltage $V_{PTC}$. In other words, the current source 606 generates different V-T curves as those generated by the voltage source 306, and there is a shift between different V-T curves.

According to the characteristics of the temperature coefficient voltage generator circuit 202, the PTC voltage $V_{PTC}$ is determined by the following formula:

$$V_{PTC} = \frac{V_T \ln N}{R_1} \times R_3 \times M;$$

where $V_T$ refers to the thermal voltage of the bipolar junction transistors (BJTs) which varies in response to temperature variation, N is the ratio of BJT pairs, and M is the ratio of W/L ratio of the high-side PMOS transistors. Take the PTC voltage $V_{PTC}$ derivative to temperature T obtains:

$$\frac{\partial V_{PTC}}{\partial T} = \frac{\partial V_T}{\partial T} \times \ln N \times \frac{R_3}{R_1} \times M.$$

It should be noted that the PTC voltage $V_{PTC}$ derivative to the temperature T refers to the slope of the corresponding V-T curve. In order to shift the V-T curve without changing its slope, a ZTC current which is irrespective to temperature variation may be included. As such, the current generated by the current source 606 may be a ZTC current Itn. When the ZTC current Itn is inserted, the PTC voltage $V_{PTC}$ may be calculated as follows:

$$V_{PTC} = \left( \frac{V_T \ln N}{R_1} \times M - Itn \right) \times R_3.$$

Therefore, the ZTC current Itn may be configured to a small value or zero when the temperature sensor 20 needs to detect low temperature. The ZTC current Itn may be configured to a larger value when the temperature sensor 20 needs to detect high temperature.

Figure 7:
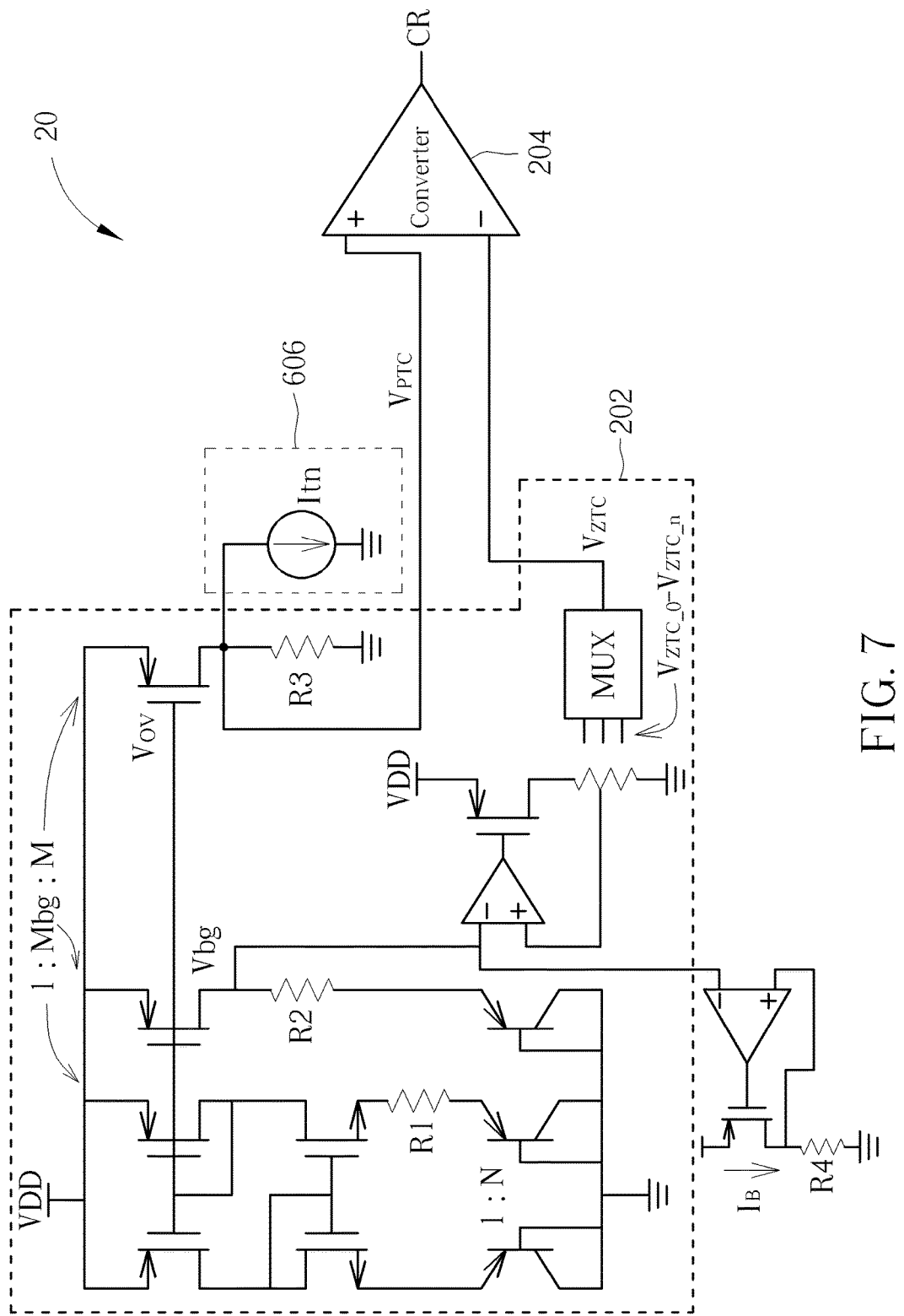
FIG. 7 is a schematic diagram of the temperature sensor including a ZTC current generated by the temperature coefficient voltage generator circuit.

Please note that the ZTC current Itn may be generated by any method. For example, the temperature coefficient voltage generator circuit may generate a bandgap voltage Vbg, and a ZTC bias current IB may be generated according to the bandgap voltage Vbg and a resistor R4, as shown in FIG. 7. The ZTC bias current IB may be mirrored or multiplied by a specific ratio to generate the ZTC current Itn coupled to the resistor R3. Alternatively, in order to enhance the stability and reliability of the ZTC current Itn, the ZTC current Itn may be generated by combining a PTC current and a NTC current. An exemplary implementation of the ZTC current Itn generated by combining a PTC current and a NTC current is described in U.S. Pat. No. 8,766,611.

Figure 8:
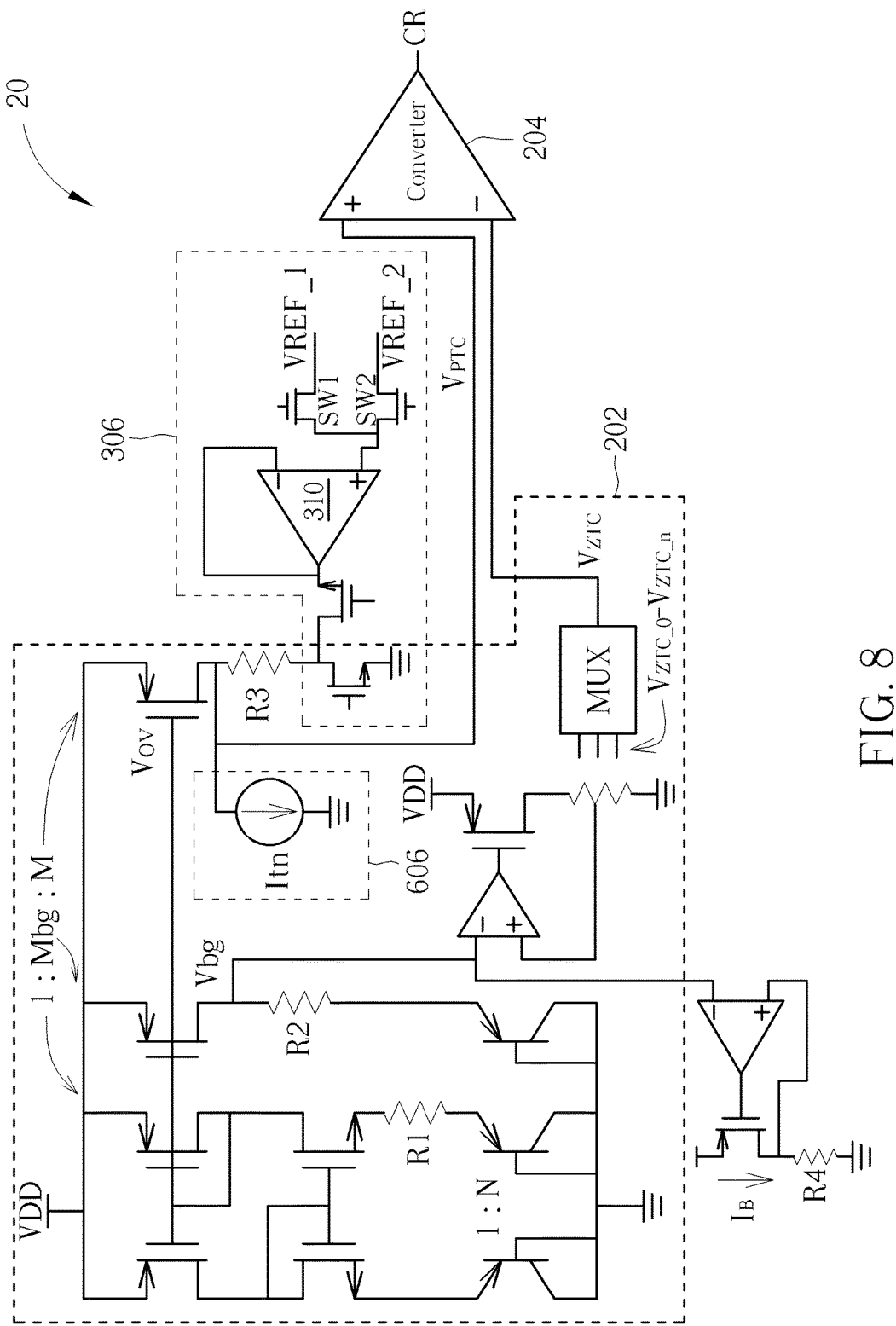
FIG. 8 is a schematic diagram of a temperature sensor including both of a variable voltage source and a variable current source.

In an embodiment, both of a variable voltage source (such as the voltage source 306 shown in FIG. 3) and a variable current source (such as the current source 606 shown in FIG. 6) may be coupled to the temperature coefficient voltage generator circuit, to generate the V-T curve of the PTC voltage according to both of the output voltage of the variable voltage source and the output current of the variable current source. A detailed implementation of a temperature sensor including both of the variable voltage source and the variable current source is illustrated in FIG. 8. As shown in FIG. 8, the voltage source 306 and the current source 606 may be controlled with time division. For example, the voltage source 306 may output a first voltage in a first time period and output a second voltage in a second time period, and the current source 606 may output a first current in a third time period and output a second current in a fourth time period. Note that the first time period may be identical to or different from the third time period, and the second time period may be identical to or different from the fourth time period.

Figure 9:
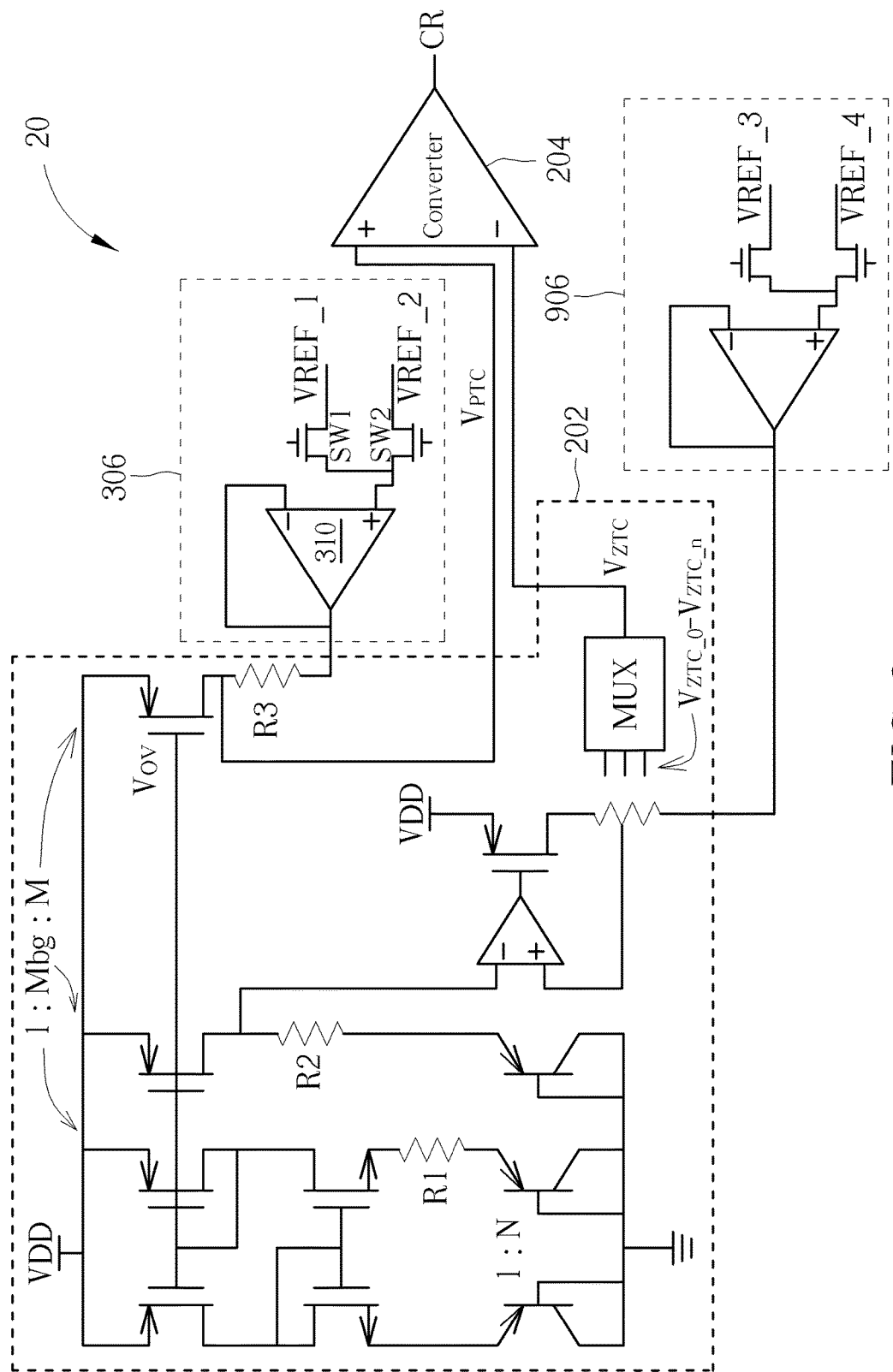
FIG. 9 is a schematic diagram of a temperature sensor including a variable voltage source coupled to the PTC voltage generator and another variable voltage source coupled to the ZTC voltage generator.

Please note that in the above embodiments, the variable voltage or current source is applied to the PTC voltage generator, where the V-T curve of the PTC voltage may shift to a higher or lower level according to the variation of the output voltage or current of the variable voltage or current source. In another embodiment, the variable voltage or current source may also be applied to the ZTC voltage generator, to change the level of the ZTC voltages. For example, a temperature sensor may include a first variable voltage source coupled to the PTC voltage generator and a second variable voltage source coupled to the ZTC voltage generator. A detailed implementation of a temperature sensor including a variable voltage source 306 coupled to the PTC voltage generator and another variable voltage source 906 coupled to the ZTC voltage generator is illustrated in FIG. 9. As shown in FIG. 9, the voltage source 306 may output the first reference voltage VREF_1 in a first time period and output the second reference voltage VREF_2 in a second time period, and the voltage source 906 may output a third reference voltage VREF_3 in a third time period and output a fourth reference voltage VREF_4 in a fourth time period. Note that the first time period may be identical to or different from the third time period, and the second time period may be identical to or different from the fourth time period.

In another embodiment, the temperature sensor may detect the ambient temperature by converting a NTC voltage and a ZTC voltage. In this embodiment, the variable voltage or current source may be coupled to the NTC voltage generator and/or the ZTC voltage generator, to generate a shift in the V-T curve of the NTC voltage or the V-T curve of the ZTC voltage.

Figure 10:
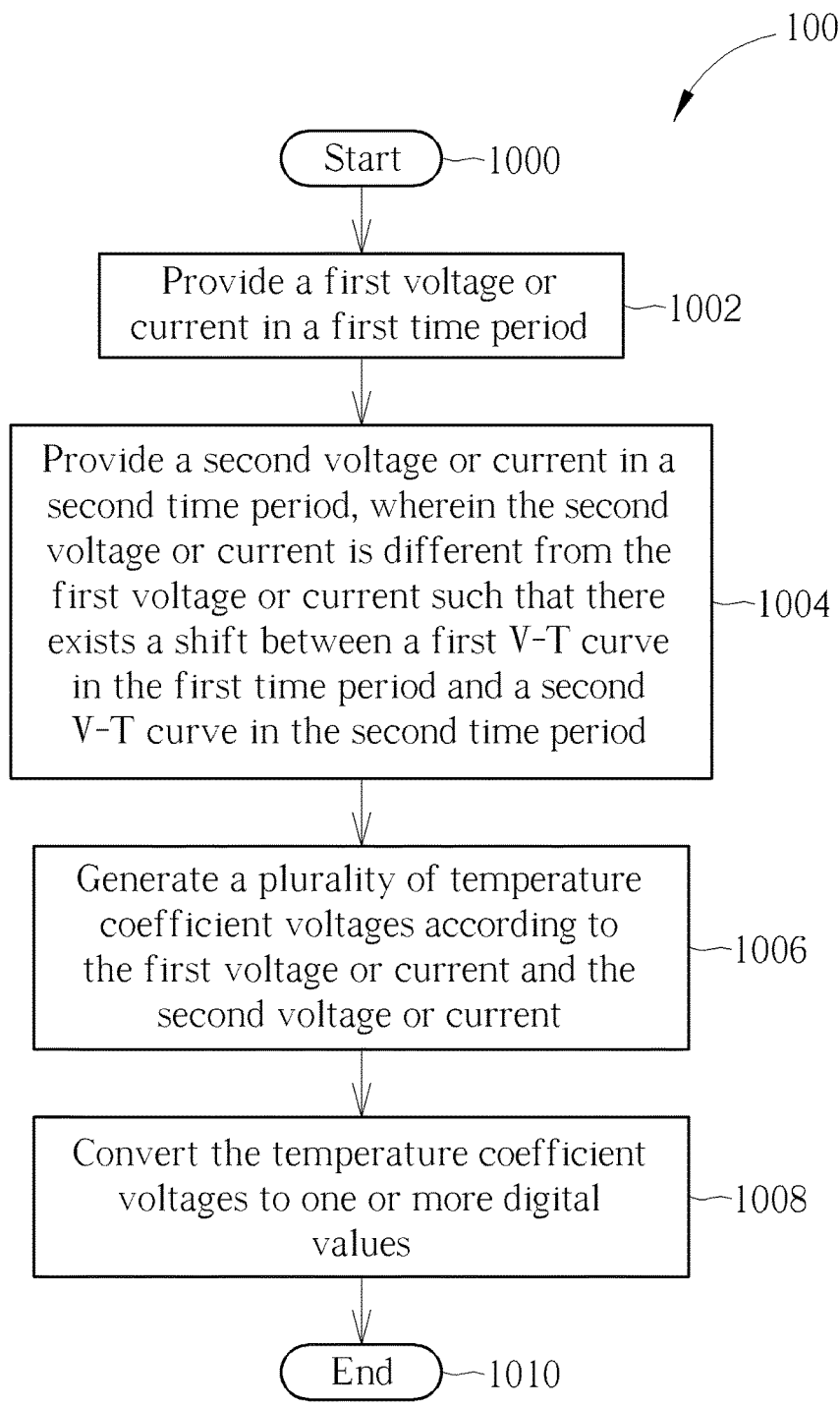
FIG. 10 is a flow chart of a temperature sensing process according to an embodiment of the present invention.

The abovementioned operation of the temperature sensor may be summarized into a temperature sensing process 100, as shown in FIG. 10. The temperature sensing process 100 includes the following steps:

Step 1000: Start.

Step 1002: Provide a first voltage or current in a first time period.

Step 1004: Provide a second voltage or current in a second time period, wherein the second voltage or current is different from the first voltage or current such that there exists a shift between a first V-T curve in the first time period and a second V-T curve in the second time period.

Step 1006: Generate a plurality of temperature coefficient voltages according to the first voltage or current and the second voltage or current.

Step 1008: Convert the temperature coefficient voltages to one or more digital values.

Step 1010: End.

Those skilled in the art may refer to the above description to obtain the detailed operations and alternations of the temperature sensing process 100, which will not be narrated hereinafter.

To sum up, the embodiments provide a temperature sensor and a related method of detecting a wide range of temperature. A variable voltage or current source may be included in the temperature sensor, for providing different voltages or currents in different time periods, which can influence the V-T curve of the PTC voltage generated by the temperature coefficient voltage generator circuit of the temperature sensor. In such a situation, there can exist a shift between the V-T curves of the PTC voltage in different time periods. As a result, the temperature sensor may detect different temperature ranges in different time periods, e.g., detect high temperature in a time period and detect low temperature in another time period, so as to achieve detection of the wide range of temperature.

FIGS. 1-10 illustrate a number of implementation specific details. Other embodiments may not include all the illustrated elements, may arrange the elements differently, may combine one or more of the elements, may include additional elements, and the like.

While some components are shown directly connected to one another in the preceding embodiments, others are shown connected via intermediate components. Nonetheless, electrical coupling may be accomplished using a number of circuit configurations, as is known in the art. For example, these embodiments can support AC and DC coupling between components.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A temperature sensor, comprising:
a plurality of temperature coefficient voltage generators, for generating a plurality of temperature coefficient voltages;
one or more converters, coupled to the temperature coefficient voltage generators, for converting the temperature coefficient voltages to one or more digital values; and
a first variable voltage or current source, coupled to at least one of the temperature coefficient voltage generators, for outputting a first voltage or current in a first time period, and outputting a second voltage or current in a second time period, wherein the second voltage or current is different from the first voltage or current such that there exists a shift between a first voltage-temperature curve in the first time period and a second voltage-temperature curve in the second time period.

2. The temperature sensor of claim 1, wherein the first variable voltage or current source allows the temperature sensor to detect a first range of temperature in the first time period and detect a second range of temperature in the second time period.

3. The temperature sensor of claim 1, wherein the first variable voltage or current source outputs the first voltage or current and the second voltage or current alternately.

4. The temperature sensor of claim 1, wherein the first variable voltage or current source further outputs a third voltage or current in a third time period, wherein the third voltage or current is different from the first voltage or current, such that there exists a shift between the first voltage-temperature curve in the first time period and a third voltage-temperature curve in the third time period, and the third voltage or current is different from the second voltage or current, such that there exists a shift between the second voltage-temperature curve in the second time period and the third voltage-temperature curve in the third time period.

5. The temperature sensor of claim 4, wherein the first variable voltage or current source determines whether to output the second voltage or current or the third voltage or current according to a temperature sensing result generated by the temperature sensor when the first variable voltage or current source outputs the first voltage or current.

6. The temperature sensor of claim 1, wherein the temperature coefficient voltage generators comprise:
a positive temperature coefficient voltage generator, for generating a positive temperature coefficient voltage; and
a zero temperature coefficient voltage generator, for generating at least one zero temperature coefficient voltage.

7. The temperature sensor of claim 6, wherein the first variable voltage or current source is a variable current source, coupled to the positive temperature coefficient voltage generator, for outputting a first current and a second current, respectively, in the first time period and the second time period.

8. The temperature sensor of claim 6, wherein the first variable voltage or current source is a first variable voltage source, coupled to the positive temperature coefficient voltage generator, for outputting a first voltage and a second voltage, respectively, in the first time period and the second time period.

9. The temperature sensor of claim 8, wherein the first voltage is a zero voltage and the second voltage is a negative voltage.

10. The temperature sensor of claim 8, further comprising:
a second variable voltage source, coupled to the zero temperature coefficient voltage generator, for outputting a third voltage and a fourth voltage, respectively, in a third time period and a fourth time period.

11. The temperature sensor of claim 8, further comprising:
a variable current source, coupled to the positive temperature coefficient voltage generator, for outputting a first current and a second current, respectively, in a third time period and a fourth time period.

12. The temperature sensor of claim 11, wherein the first current and the second current are zero temperature coefficient currents.

13. A temperature sensor, comprising:
a plurality of temperature coefficient voltage generators, for generating a plurality of temperature coefficient voltages;
one or more converters, coupled to the temperature coefficient voltage generators, configured to convert the temperature coefficient voltages to one or more digital values; and
a variable voltage or current source, coupled to at least one of the temperature coefficient voltage generators and configured to output different voltages or currents, respectively, in a plurality of time periods.

14. A method of detecting a temperature, comprising:
providing at least one voltage or current to generate a plurality of temperature coefficient voltages; and
converting the temperature coefficient voltages to one or more digital values;
wherein the step of providing at least one voltage or current to generate a plurality of temperature coefficient voltages comprises:
providing a first voltage or current in a first time period, and providing a second voltage or current in a second time period, wherein the second voltage or current is different from the first voltage or current such that there exists a shift between a first voltage-temperature curve in the first time period and a second voltage-temperature curve in the second time period.

15. The method of claim 14, further comprising:
detecting a first range of temperature by providing the first voltage or current in the first time period, and detecting a second range of temperature by providing the second voltage or current in the second time period.

16. The method of claim 14, further comprising:
outputting the first voltage or current and the second voltage or current alternately.

17. The method of claim 14, further comprising:
providing a third voltage or current in a third time period, wherein the third voltage or current is different from the first voltage or current, such that there exists a shift between the first voltage-temperature curve in the first time period and a third voltage-temperature curve in the third time period, and the third voltage or current is different from the second voltage or current, such that there exists a shift between the second voltage-temperature curve in the second time period and the third voltage-temperature curve in the third time period.

18. The method of claim 17, further comprising:
determining whether to output the second voltage or current, or the third voltage or current according to a temperature sensing result generated by a temperature sensor when the first voltage or current is outputted.

19. The method of claim 14, wherein the step of providing at least one voltage or current to generate a plurality of temperature coefficient voltages further comprises:

providing a positive temperature coefficient voltage and at least one zero temperature coefficient voltage.

20. The method of claim 19, wherein the step of providing a first voltage or current in a first time period and providing a second voltage or current in a second time period comprises:

providing a first current and a second current for the positive temperature coefficient voltage in the first time period and the second time period, respectively.

21. The method of claim 19, wherein the step of providing a first voltage or current in a first time period and providing a second voltage or current in a second time period comprises:

providing a first voltage and a second voltage for the positive temperature coefficient voltage in the first time period and the second time period, respectively.

22. The method of claim 21, wherein the first voltage is a zero voltage and the second voltage is a negative voltage.

23. The method of claim 21, wherein the step of providing at least one voltage or current to generate a plurality of temperature coefficient voltages further comprises:

providing a third voltage and a fourth voltage for the zero temperature coefficient voltage in a third time period and a fourth time period, respectively.

24. The method of claim 21, wherein the step of providing at least one voltage or current to generate a plurality of temperature coefficient voltages further comprises:

providing a first current and a second current for the positive temperature coefficient voltage in a third time period and a fourth time period, respectively.

25. The method of claim 24, wherein the first current and the second current are zero temperature coefficient currents.

* * * * *